United States Patent [19]

Natsume et al.

[11] Patent Number: 4,593,920
[45] Date of Patent: Jun. 10, 1986

[54] VEHICLE HEIGHT CONTROL SYSTEM

[75] Inventors: Kazuyuki Natsume, Toyohashi; Yoshihiro Sasage, Shizuoka; Naoto Ooka, Toyohashi; Kaoru Oohashi, Okazaki, all of Japan

[73] Assignees: Nippondenso Co., Ltd., Kariya; Toyota Jidosha Kabushiki Kaisha, Toyota, both of Japan

[21] Appl. No.: 665,065

[22] Filed: Oct. 26, 1984

[30] Foreign Application Priority Data

Oct. 27, 1983 [JP] Japan ................ 58-202435

[51] Int. Cl.⁴ .............................................. B60G 17/00
[52] U.S. Cl. ...................... 280/6 R; 180/41; 280/707
[58] Field of Search .............. 280/707, 6.1, 6.11, 280/6 H, 6 R; 180/41

[56] References Cited

U.S. PATENT DOCUMENTS

| | | | |
|---|---|---|---|
| 3,884,496 | 5/1975 | Ito et al. | 280/6 H |
| 3,917,295 | 11/1975 | Hiruma | 280/6 H |
| 4,364,574 | 12/1982 | Saito | 280/707 |
| 4,371,182 | 2/1983 | Brown | 280/6 H |
| 4,391,452 | 5/1983 | Ohmori | 280/707 |
| 4,483,546 | 11/1984 | Brearley | 280/6 R |

Primary Examiner—Richard A. Bertsch
Attorney, Agent, or Firm—Cushman, Darby & Cushman

[57] ABSTRACT

A vehicle height control system includes a plurality of vehicle height adjusters actuated by a hydropneumatic actuating system and controlled by control signals from a control unit. The control unit calculates, for each of the vehicle height adjusters, a target difference between a target adjustment position set by a setting device and an actual position detected by a vehicle height sensor associated with the adjuster, and the control unit generates the control signals in accordance with the respective target differences. The control unit further selects a maximum target difference, and calculates deviations of the target differences from the maximum target difference. When any of the deviations exceeds a predetermined value, the adjustment operation of the vehicle height adjuster associated with this deviation is temporarily stopped thereby correcting the nonuniformity of the adjustments in the vehicle height adjusters.

5 Claims, 3 Drawing Figures

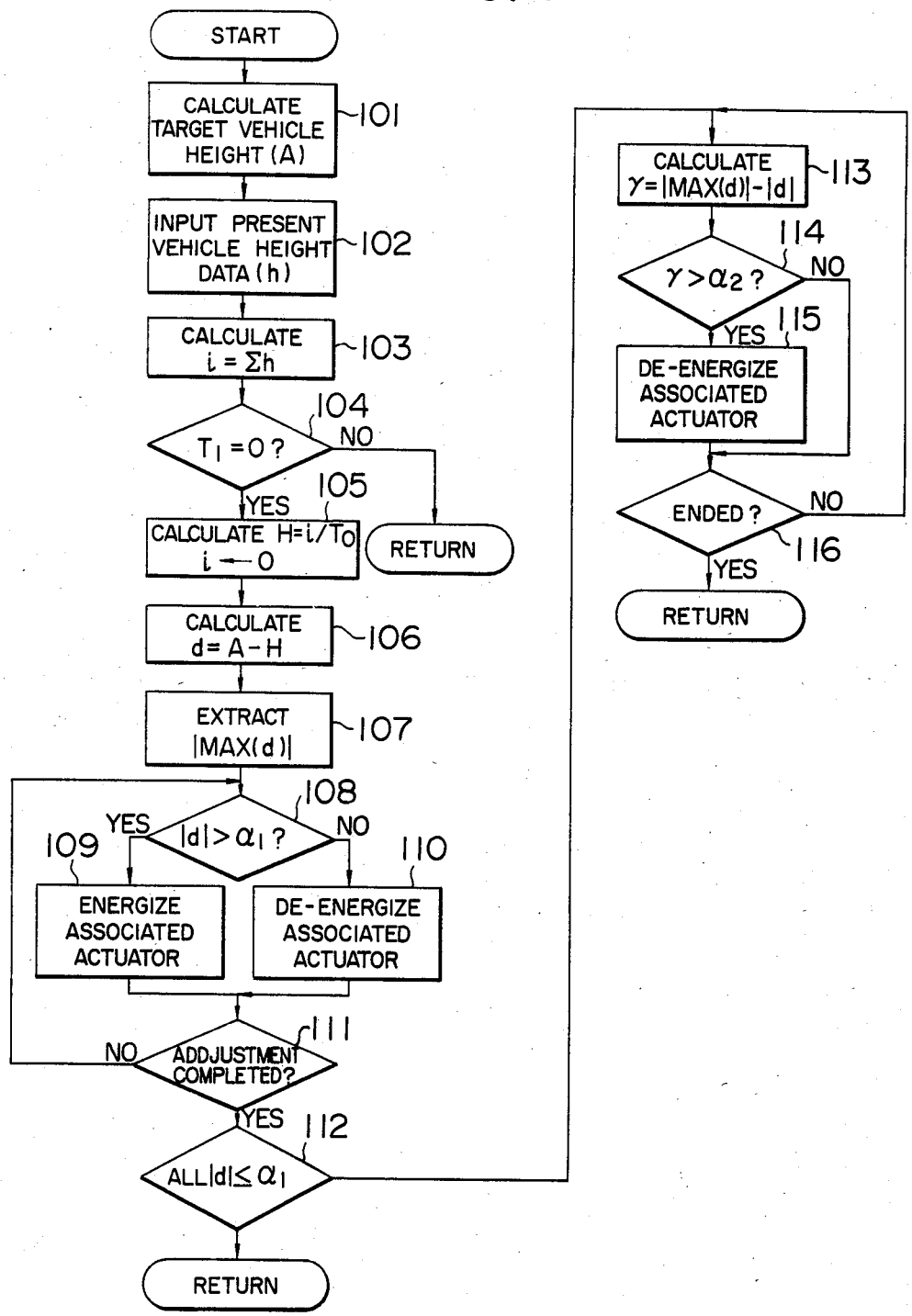

VEHICLE HEIGHT CONTROL SYSTEM

FIELD OF THE INVENTION

The present invention relates to a vehicle body height control system, or more particularly, to a vehicle body height control system with an improved travelling feeling or performance during the process of the vehicle body height adjustment. The system of this invention is hereinafter referred to simply as the vehicle height control system.

BACKGROUND OF THE INVENTION

The present invention is applicable to a vehicle height control system comprising a vehicle height adjuster for each of the wheels (a single adjuster may be provided for all of the rear wheels) for controlling the distance between each of the wheels and the vehicle body, that is, the vehicle body height, with each adjuster independently.

A vehicle height control system has been proposed heretofore, in which, in order to obtain a desired vehicle height in response to the number of passengers, the amount of loads, the travelling conditions and the road surface conditions, a plurality of vehicle height adjusters are employed to control the vehicle height at a target level.

In such a conventional vehicle height control system, when all the vehicle height adjusters are extended or contracted by the same length, the extension or contraction rate (the adjusting rate) would be different between the respective vehicle height adjusters due to the differences in the loads on or in the suspension spring characteristics of the respective vehicle height adjusters.

This variation in the adjusting rate causes an unstable slant of the vehicle body under adjustment and undesirably makes the driver and passengers (hereinafter simply called "the driver") feel uneasy.

This problem is attributable to the fact that each of the vehicle height adjusters is extended or contracted without regard to the adjusting rates of the other vehicle height adjusters.

SUMMARY OF THE INVENTION

The present invention is intended to obviate the above-mentioned disadvantage of the prior art system.

The primary object of the present invention is to provide an improved vehicle height control system which gives an improved travelling feeling or performance during the process of the vehicle height adjustment.

To achieve this object, the present invention provides a vehicle height control system wherein, in order for each of the vehicle height adjusters to operate in coordination with the other vehicle height adjusters, the adjusting operation of a vehicle height adjuster operating at a high adjusting rate is intermitted occasionally. Namely, the present invention provides a vehicle height control system wherein actual positions resulting from the adjustment of a plurality of vehicle height adjusters are fed back to a control means which operates to compensate for variations in the adjusting procedure among the vehicle height adjusters.

Thus, the vehicle height control system of this invention comprises a plurality of vehicle height adjusters adapted to operate in response to a control signal, position signal generator means for generating an actual position signal in accordance with the result of the adjustment of the respective adjusters, setting means for changing the target adjustment positions of the adjusters, and control means for calculating the target difference between the actual position and the target adjustment position of each adjuster in response to signals from the position signal generator means and the setting means and generating and supplying to the adjusters a plurality of control signals for changing the adjusting rate of each of the adjusters in accordance with the difference between a plurality of target differences obtained.

BRIEF DESCRIPTION OF THE DRAWINGS

The present invention will be apparent from the following detailed description taken in conjunction with the accompanying drawings, in which:

FIG. 3 is a flowchart of a control program for the operating circuit comprised in the electric control unit shown in FIG. 2.

DETAILED DESCRIPTION OF THE INVENTION

Figure 1:
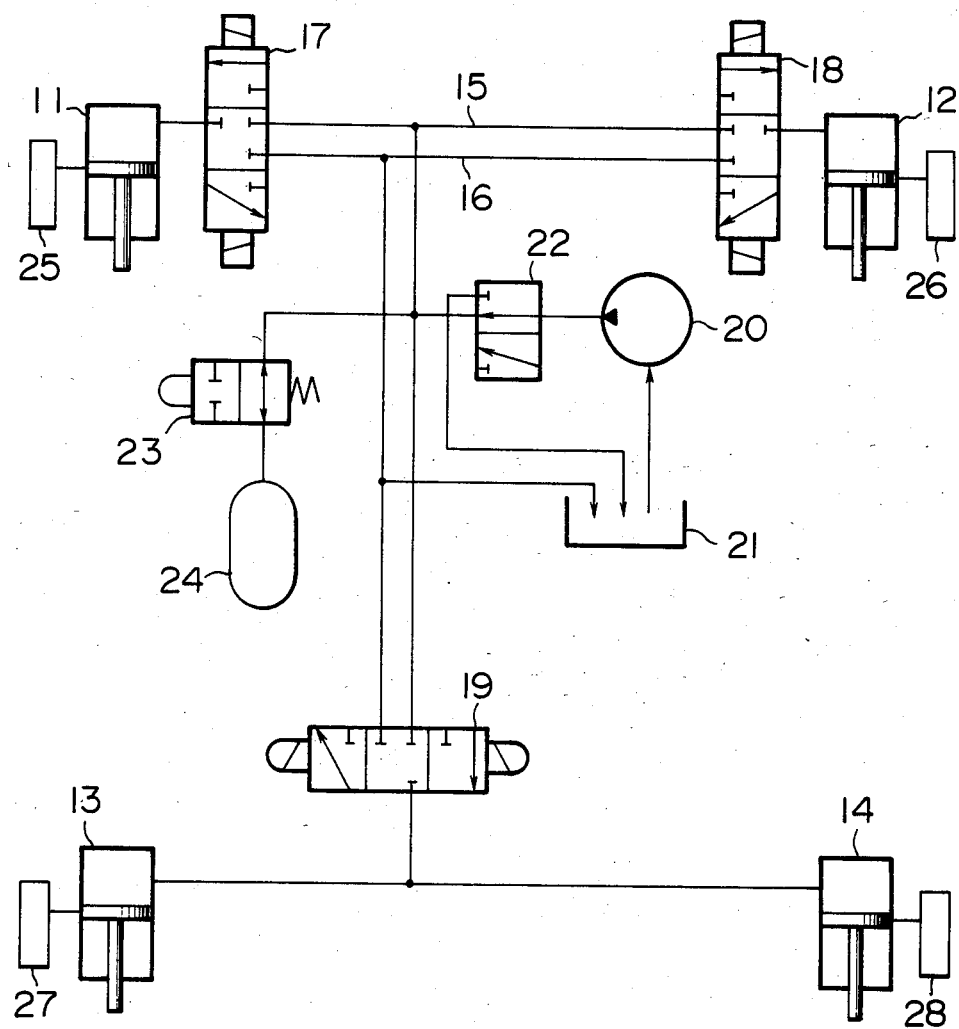
FIG. 1 is a schematic diagram showing the arrangement of the vehicle height adjusters of an embodiment of the present invention.

An arrangement of the adjusters according to the present invention as applied to a hydropneumatic suspension system is shown in FIG. 1. In FIG. 1, reference numerals 11 to 14 designate shock absorbers, or, in particular, vehicle height adjusting sections thereof. The respective shock absorbers 11, 12 for the front wheels, combined with three-position solenoid valves 17, 18 capable of switching the connection between an oil supply passage 15 and an oil drain passage 16, form vehicle height adjusters capable of adjusting the distance between the wheels and the vehicle body, that is, the vehicle height. The respective shock absorbers 13, 14 for the rear wheels, combined with a similar three-position solenoid valve 19 capable of switching the connection between the oil supply passage 15 and the oil drain passage 16 in common to both shock absorbers 13, 14, form other vehicle height adjusters.

In the oil supply/drain system, the oil pumped up from a reservoir 21 by an electrically-operated hydraulic pump 20 is supplied through a regulation valve 22 to the oil supply passage 15. The regulation valve 22 operates in such a manner as to connect the pump 20 to the reservoir 21 when the oil supply pressure is more than a predetermined level. The oil supply passage 15 is connected with an accumulator 24 through a normally closed solenoid valve 23 for preventing the oil supply pressure from pulsating.

In each vehicle height adjuster, upon energization of the corresponding one of the solenoid valves 17 to 19 to a position to connect the shock absorbers 11, 12 and 13, 14 with the oil supply passage 15 respectively, oil is supplied into the corresponding one of the vehicle height adjusting cylinders of the shock absorbers 11 to 14, so that the vehicle body height is increased against the vehicle body weight. When the solenoid valves are energized to a position to connect the shock absorbers 11, 12 and 13, 14 to the oil drain passage 16, respectively, on the other hand, oil is drained from the cylinders to decrease the vehicle height.

The shock absorbers 11 to 14 are provided with vehicle height sensors 25 to 28 for generating an actual position signal indicative of the vehicle height corresponding to the result of the adjustment of the respective vehicle height adjusters. These vehicle height sensors generate a signal changing stepwise or continuously in accordance with the vehicle height and may be of a well-known photo-electric or inductance type.

Figure 2:
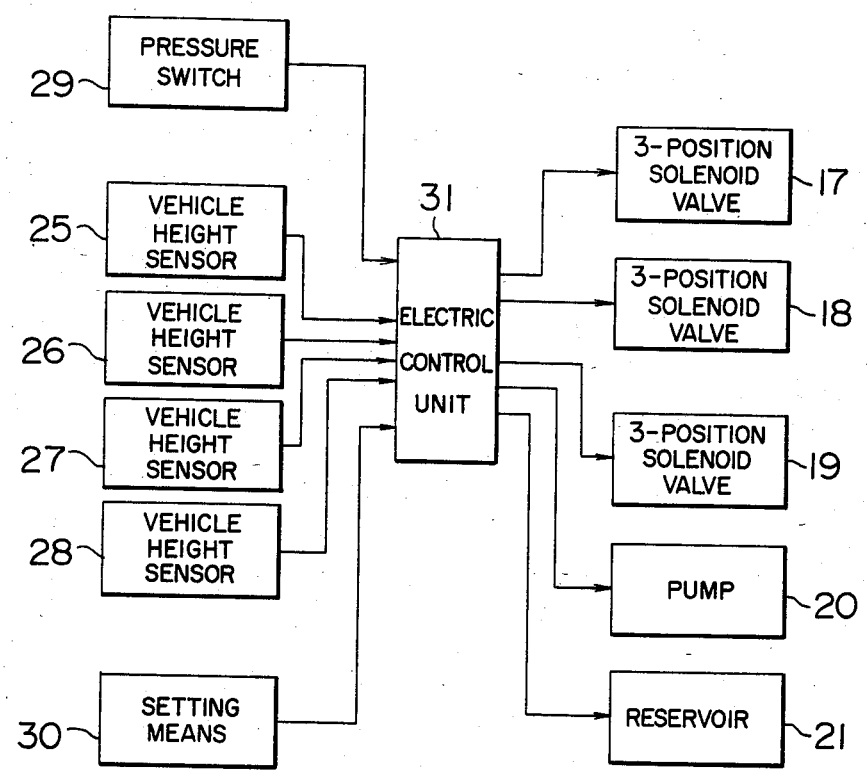
FIG. 2 is an electric circuit diagram of the system of this invention.

A construction of an electric circuit of this system is shown in FIG. 2. Numeral 29 designates a pressure switch for generating a signal when the pressure in the oil supply passage 15 exceeds a set level, which pressure switch is located at an appropriate position in the oil supply passage 15 and generates a signal for actuating the solenoid valve 23 connected with the accumulator 24.

The setting means designated by numeral 30 generates a change signal for changing the target adjustment position for controlling the vehicle height in relation to at least one of the operating factors corresponding to the number of passengers and the amount of loads, the travelling conditions such as a vehicle speed, the road surface conditions such as an inclination thereof, the operation of a manual switch, etc., as is well known in the art.

Signals generated by the vehicle height sensors 25 to 28, the pressure switch 29 and the setting means 30 are applied to the electric control unit 31. The electric control unit 31 includes an operating circuit (microcomputer) for performing a processing operation in accordance with a predetermined computer program, and an input/output interface for applying the input signal to the operating circuit and transmitting an output signal corresponding to the result of operation of the operating circuit to an external circuit.

FIG. 3 shows essential parts of the vehicle height control program used in the present invention which is executed by the operating circuit of the electric control unit 31. The program shown in this drawing controls repeated vehicle height adjusting processes. To this program is added another control program, not shown, for applying an operating signal to the electrically-operated pump 20 when a main switch (not shown) is switched on upon turning on of a vehicle key switch.

The operation of this system will be explained with reference to the vehicle height control program. Firstly, at a program step 101 shown in FIG. 3, the operating circuit of the electric control unit 31 calculates (sets) data A indicative of a target adjustment position for each of the vehicle height adjusters on the basis of the change signal supplied thereto from the setting means 30, whereby target positions $A_1$, $A_2$ and $A_3$ for the respective adjusters are obtained separately which assume predetermined values, respectively, in relation to the change signal. The target position $A_1$ represents a target value for the front left wheel, $A_2$ that for the front right wheel, and $A_3$ that for the two rear wheels (an average value).

At step 102, the actual position signals generated from the vehicle height sensors 25 to 28 are stored in the operating circuit as data h indicative of actual instantaneous vehicle heights. The data h comprise vehicle height data $h_1$, $h_2$ and $h_3$ including an average value of the vehicle heights on the two rear wheels. The vehicle height data h are accumulated at step 103 thereby to calculate data i ($i_1$, $i_2$, $i_3$) representing the accumulated vehicle heights in a given set time length $t_1$. Step 104 determines the set time length $t_1$ by monitoring timer data $T_1$ which are periodically reduced to zero by being updated by the counting-up caused by a timer routine not shown.

Upon the lapse of the set time length $t_1$, step 105 is executed by the operating circuit. At step 105, each of the accumulated vehicle height data i is divided by the set data $T_0$ corresponding to the set time $t_1$ thereby to calculate average vehicle height data H ($H_1$, $H_2$, $H_3$) indicative of the actual position. In subsequent parts of the control program, the average vehicle height data H will be called the vehicle height data. Further, step 105 clears the accumulated vehicle height data i into zero.

At step 106, differences between the vehicle height data H (actual position) and the target adjustment position A for the respective adjusters, that is, the target differences d ($d_1$, $d_2$, $d_3$) are calculated. The next step 107 extracts the maximum value MAX(d) of the target differences thus calculated.

The operating circuit of the electric control unit 31 performs an initial adjusting operation for each adjuster at steps 108 to 110. Specifically, at step 108, the target difference d of an adjuster is compared with a tolerance $\alpha_1$, and if the target difference d exceeds the tolerance $\alpha_1$, step 109 generates an output signal from the operating circuit for energizing an associated three-position solenoid valve. In the process of execution of step 109, an energizing signal for connecting the shock absorber to the oil supply passage 15 is generated if the target difference d is positive, while an energizing signal for connecting the shock absorber to the oil drain passage 16 is generated if the target difference d is negative. If the target difference d stays within the tolerance $\alpha_1$, on the other hand, no energizing signal for the associated three-position solenoid valve is generated at step 110, thereby de-energizing the same solenoid valve.

When the electric control unit 31 generates an energizing signal for connecting the shock absorber to the oil supply passage 15 at step 109, the signal from the pressure switch 29 is checked, and if this signal indicates a level higher than a set level, an output signal is generated to energize and open the solenoid valve 23 connected to the accumulator 24, thereby preventing the oil supply pressure from suddenly increasing.

The primary adjusting operation shown at steps 108 to 110 is performed sequentially for the respective adjusters until the completion of the adjustments for all the adjusters is confirmed at step 111. Upon completion of the initial adjusting operation for all the adjusters, step 112 checks to decide whether the target difference d for each adjuster is within the tolerance. If all the target differences are within the tolerance, it is decided that the execution of this control program is completed, and the execution of the control program from the step 101 is restarted. In returning to step 101, the energizing signal to the solenoid valve 23 is removed.

In this way, the process is returned from step 112 to step 101, only when the actual vehicle height H coincides with the target position A within the tolerance $\alpha_1$ for each adjuster and the actual vehicle height or the target position remains unchanged.

In the case where the target difference d exceeds the tolerance $\alpha_1$, on the other hand, the secondary adjusting operation is executed based on an instruction from the electric control unit 31 according to the control program shown in steps 113 to 116. In this secondary adjusting operation, the adjustment variations for the respective adjusters, that is, variations in the adjusting rate, are grasped, and according to the result thereof, the adjusting operation of an adjuster of a higher adjusting rate is intermitted temporarily.

Namely, step 113 calculates a difference $\gamma$ between the maximum value MAX(d) of the target differences extracted at step 107 and the target difference d for another adjuster, and step 114 checks to decide whether this difference $\gamma$ is larger than a predetermined value $\alpha_2$. (The value of the difference $\gamma$ includes the case where $\gamma > 0$.) If it is decided that the difference $\gamma$ is larger than the set value $\alpha_2$, that is, that the variation in the adjusting operation is larger than the set value, the application of an energizing signal to the associated three-position solenoid valve is stopped in order to stop the adjusting operation (to cancel any possible energized state by step 109) of the adjuster having the target difference d compared at step 115.

Upon execution of the comparing process for the adjuster having a maximum target difference and another adjuster at steps 113 to 115, the process is returned from step 116 to 113, and a similar comparison is made for the other adjuster, and if the target difference d for the adjuster thus compared is smaller than the maximum value MAX(d) by more than the set value $\alpha_2$, the adjusting operation of the adjuster thus compared is also stopped.

In this way, if there is any adjuster found to be operating in great advance of the other adjusters, the adjusting operation of the particular adjuster is temporarily stopped in accordance with the difference in the target differences of the respective adjusters. Since the electric control unit 31 repeatedly executes the control program from step 101, the program is executed bypassing the step 115 from step 114 when the target difference for the adjuster under continuing adjustment approaches that for the adjuster of which the adjusting operation is intermitted.

Thus, according to the system of this embodiment, the vehicle height is controlled to a target state without causing any unbalanced vehicle height between adjusters by controlling a three-position solenoid valve in accordance with the variations in the adjusting operations of the adjusters, especially, the adjusting rates thereof. This advantage of this system is effectively applied to the adjusting operation of a plurality of vehicle height adjusters, in which the vehicle height on the front wheels is increased or decreased from a certain height, the vehicle height on one of the front or rear wheels is increased while that on the other thereof is decreased, or all the adjusters are raised or lowered.

The present invention may also be applicable to a vehicle equipped with a vehicle height adjuster using an air suspension, in which case the oil supply/drain system may be replaced by a compression air supply/exhaust system. In the case of the air suspension having a considerably slow adjusting rate for the adjusters, the application of the control program shown in FIG. 3 requires a long set time length $t_1$.

Further, in the construction of the embodiment described above, individual parts may be replaced with equivalent parts termed differently, or the control program for the operating circuit may be partially altered, if necessary.

It will be understood from the foregoing description that, according to the present invention, variations in the process of adjustment of a plurality of adjusters are grasped in accordance with the result of adjustment of the adjusters, and the respective adjusters are controlled so as to eliminate such variations, so that the vehicle body is not slanted in an unbalanced way during the process of adjustment of the vehicle height, thus making it possible to attain stable vehicle height control and to impart an improved travelling feeling or performance.

We claim:

1. A vehicle height control system comprising:
    a plurality of vehicle height adjusters operated in response to respective control signals;
    position signal generator means for generating actual position signals each representing a vehicle height of a corresponding one of said vehicle height adjusters;
    setting means for changing target adjustment positions of said vehicle height adjusters respectively; and
    control means for generating said control signals for respective vehicle height adjusters in accordance with target differences each representing a difference between the target adjustment position and the actual position signal of the corresponding one of said adjusters, thereby enabling said vehicle height adjusters to achieve said target adjustment positions respectively,
    said control means calculating differences between said target differences one from another, and when any one of said calculated differences exceeds a predetermined level, said control means temporarily stopping generation of the control signal to the vehicle height adjuster whose actual position is the closest to its target adjustment position.

2. A system according to claim 1, wherein said control means selects a maximum value from said target differences, and calculates the difference between the maximum value and each of said target differences.

3. A system according to claim 1, wherein said vehicle height adjusters are actuated by a plurality of actuating systems corresponding to a plurality of wheels.

4. A system according to claim 2, wherein said plurality of actuating systems includes a two systems for right and left front wheels respectively, and includes one system for right and left rear wheels to simultaneously adjust the two rear wheels.

5. A vehicle height control system comprising:
    a plurality of vehicle height adjusters operated in response to respective control signals;
    position signal generator means for generating actual position signals each representing a vehicle height of a corresponding one of said vehicle height adjusters;
    setting means for changing target adjustment positions of said vehicle height adjusters respectively; and
    control means for generating said control signals for said vehicle height adjusters to enable said adjusters to adjust respective vehicle heights and to achieve said target adjustment positions,
    said control means calculating differences for said respective vehicle height adjusters, each of said target differences representing a difference between the target adjustment position and the actual position signal of a corresponding one of said adjusters, and further calculating differences between said target differences one from another, and wherein when any one of said calculated differences exceeds a predetermined level, said control means temporarily stops application of the control signal to the vehicle height adjuster whose actual position is the closest to its target adjustment position.

* * * * *